United States Patent [19]

Suzuki

[11] 3,921,077

[45] Nov. 18, 1975

[54] NOISE REDUCTION APPARATUS

[75] Inventor: Kouzi Suzuki, Gumma, Japan

[73] Assignees: Sanyo Electric Company, Ltd., Osaka; Tokyo Sanyo Electric Co., Ltd., Bumma, both of Japan

[22] Filed: June 6, 1974

[21] Appl. No.: 477,035

[30] Foreign Application Priority Data

June 6, 1973 Japan ................................ 48-64401

[52] U.S. Cl.................. 325/477; 325/480; 333/17 R

[51] Int. Cl.[2]............................................ H04B 1/10

[58] Field of Search ........... 325/473, 477, 480, 474, 325/482, 65; 333/17 R

[56] References Cited

UNITED STATES PATENTS

| | | | |
|---|---|---|---|
| 2,425,968 | 8/1947 | Tunick | 325/477 |
| 3,678,416 | 7/1972 | Burwen | 333/17 |
| 3,803,496 | 4/1974 | Groen | 325/482 |

*Primary Examiner*—George H. Libman
*Attorney, Agent, or Firm*—Armstrong, Nikaido & Wegner

[57] ABSTRACT

A noise reduction apparatus is provided which comprises a variable filter circuit which has a frequency characteristic which changes in response to an input signal of from a program source applied thereto so that the noise component of high frequency can be reduced and high fidelity reproduction of the input signal from the program source can be performed.

3 Claims, 5 Drawing Figures

NOISE REDUCTION APPARATUS

BACKGROUND OF THE INVENTION

1. Field of the Invention

The present invention relates to a noise reduction apparatus comprising a filter circuit which has an attenuation ratio can be changed in response to frequency and amplitude of an input signal from a program source, so that high fidelity reproduction can be obtained with the elimination of noise.

2. Description of the Prior Art

A well known simple method for eliminating a noise component of high frequency such as hiss noise occurring in the reproduction of a recorded tape or other noise occurring in the reproduction of an FM broadcasting signal is to provide a filter circuit having high frequency attenuation characteristics in a portion of the reproduction circuit of a tape recorder of FM receiver. However, such a conventional method has a disadvantage that the high fidelity reproduction can not be performed since the filter circuit absorbs not only the noise component but also the high frequency signal which is to be reproduced.

SUMMARY OF THE INVENTION

This invention is made to provide a noise attenuation circuit for use in a signal transmission circuit, which processes an audio signal to obtain high fidelity reproduction of the audio signal and which elimanates noise.

Before the description of the present invention proceeds, some background information relating to the sensitivity of human hearing will be described.

Where an audio signal to be reproduced consisting of a low frequency component accompanying a noise component of high frequency is reproduced, human ears sense the noise of high frequency strongly. Therefore, in this case, a high frequency filter for eliminating the noise component should be provided in a reproduction circuit for the audio signal.

On the other hand, where an audio signal to be reproduced comprising a high frequency component of a program source and a noise component of high frequency is reproduced, the noise component is not heard by the human ears since the noise component is effectively masked by the high frequency component of the program source. The same can be said where amplitude of the audio signal to be reproduced is large. In this case, the high frequency filter as described above should be removed from the reproduction circuit so as to reproduce the high frequency component of the program source.

From the foregoing, it can be said that a high fidelity reproduction circuit can be made by providing a filter circuit in a reproduction circuit, of which the band pass width changes in response to frequency and/or amplitude of an audio signal of program source.

However, such a filter circuit should have particular characteristics as hereinafter described.

One required characteristic is that the operation of changing the band pass width should be performed rapidly, another required characteristic is that, in the change over operation, the frequency characteristic of the filter should change not be step by step but rather continuously.

However, such filter circuit is not present in the prior art.

Accordingly, an essential object of the present invention is to provide a noise reduction apparatus having a filter circuit of which the width of the pass band can be changed in response to the frequency component and amplitude of the original signal of a program source so as to reproduce the original signal faithfully without noise.

BRIEF DESCRIPTION OF THE DRAWINGS

The present invention will be fully described hereinafter in connection with embodiments of the present invention with reference to attached drawings in which.

DESCRIPTION OF THE PREFERRED EMBODIMENTS

Figure 1:
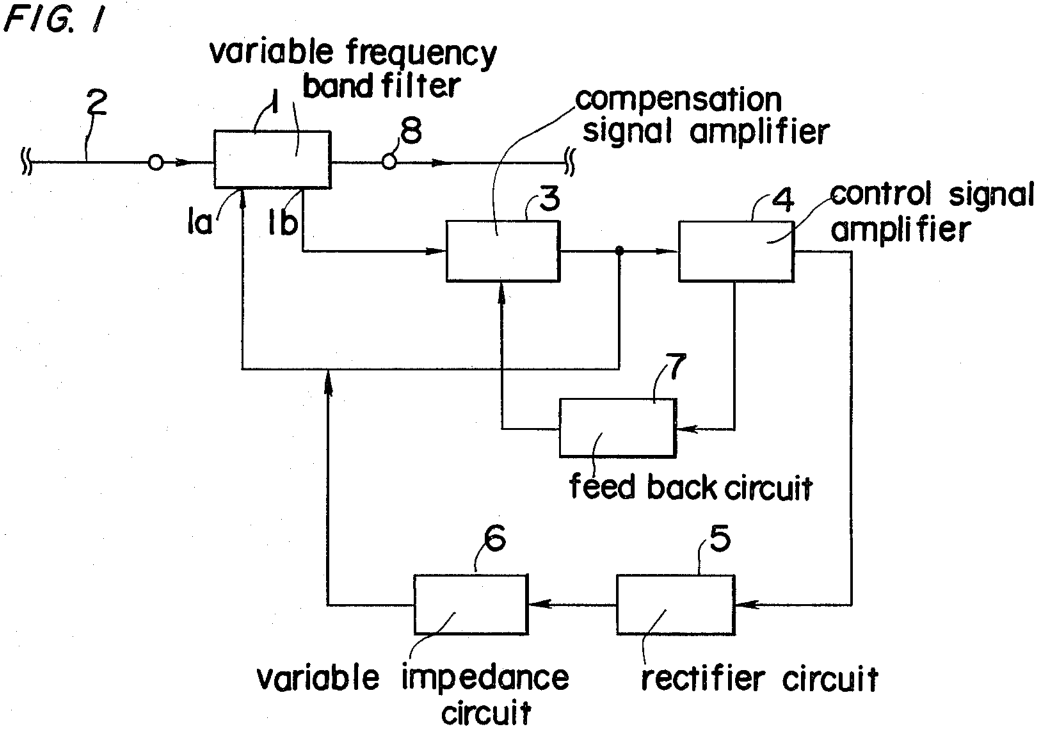
FIG. 1 is a block diagram showing an embodiment of the present invention.
Figure 5:
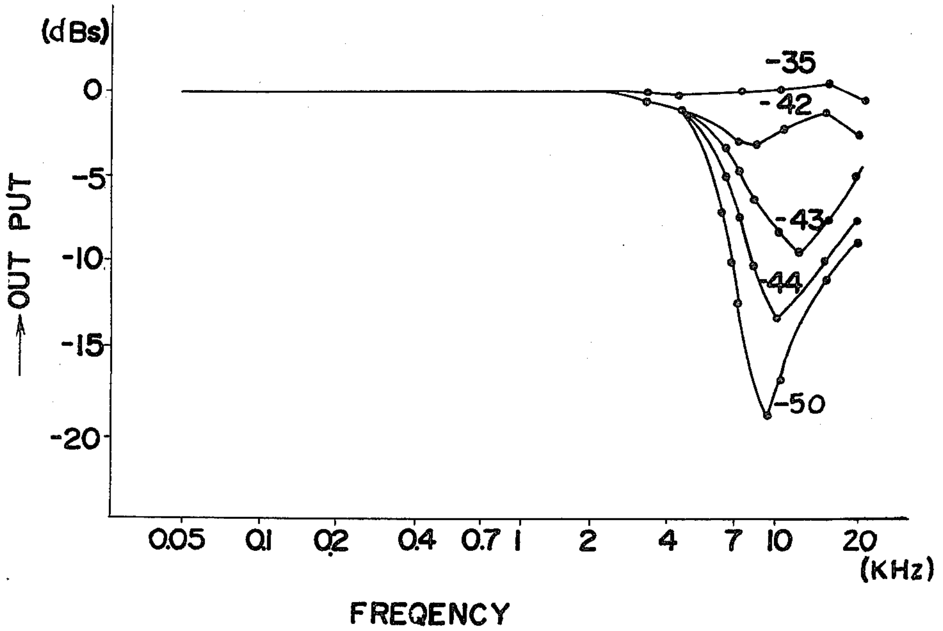
FIG. 5 is a characteristic curves of the noise reduction apparatus of the present invention.

Referring now to FIG. 1, there is provided a variable frequency band filter circuit 1 in an audio signal transmission path 2 to which the original audio signal of a program source and accompanying noise component of high frequency is applied. The filter circuit 1 passes all frequencies of the audio signal when no compensation signal is fed to an input terminal 1*a* of the filter circuit 1 from a compensation signal amplifier 3. On the other hand, the filter circuit 1 acts as a high frequency filter which eliminates high frequency components higher than about 4 KHz as shown in FIG. 5, for example, when a compensation signal is applied to the input terminal 1*a*.

A part of the original audio signal is derived from a terminal 1*b* of the filter circuit 1, and this derived audio signal, which is in proportion to the original input signal, is applied to the compensation signal amplifier 3. The outputs of the compensation signal amplifier 3 are fed to the input terminal 1*a* of the filter circuit 1 and a control signal amplifier 4. The control signal amplifier 4 produces an output signal where the original audio signal has a high frequency component or the amplitude of the original audio signal is larger than a predetermined value.

The output of the control signal amplifier 4 is rectified in a rectifier circuit 5 and thereafter applied to variable impedance circuit 6 which lowers the input impedance of the input terminal 1*a* of the filter circuit 1.

A negative feed back circuit 7 is provided between the control signal amplifier 4 and the compensation signal amplifier 3 for the improving characteristics of the filter circuit 1.

In operation, when original audio signal is applied to the input terminal of the filter circuit 1, a part of original audio signal is derived from the output terminal 1*b* and fed to the compensation signal amplifier 3 in which the derived signal is amplified and in turn fed to the control amplifier 4.

Where the original signal has high frequency component or large amplitude, the control signal amplifier 4 an produces output, which is applied to the rectifier circuit 5. The output of the rectifier circuit 5 is applied to the variable impedance circuit 6 to lower the internal impedance of the circuit 6, therefore the input impedance of the input terminal 1*a* of the filter circuit 1 is also lowered so that a compensation signal fed from the compensation signal amplifier 3 disappears.

Then, the filter circuit 1 operates as a full range transmission circuit, and allows to pass therethrough the original audio signal directly to the output terminal 8.

When such an output signal obtained on the output terminal of the filter circuit 1 is reproduced by means of a speaker system, the high frequency component of the original audio signal of the program source can be reproduced faithfully. In this case, although the noise component of high frequency may not be eliminated by the filter circuit 1, human ears do not sense such the noise component, since the original program source masks the noise component as hereinbefore described.

When the original signal does not include a high frequency component other than a hiss noise component or the amplitude thereof is small, the control signal amplifier 4 produces no output signal, therefore the variable impedence circuit 6 maintains a high impedance. Therefore, the compensation signal can be applied to the input terminal 1*a* of the filter circuit 1 from the compensation amplifier 3. The filter circuit 1 operates as a high frequency filter in response to the application of the compensation signal, thereby causing the hiss noise component to be attenuated in the filter circuit 1. Therefore, only the necessary audio signal is reproduced.

Figure 2:
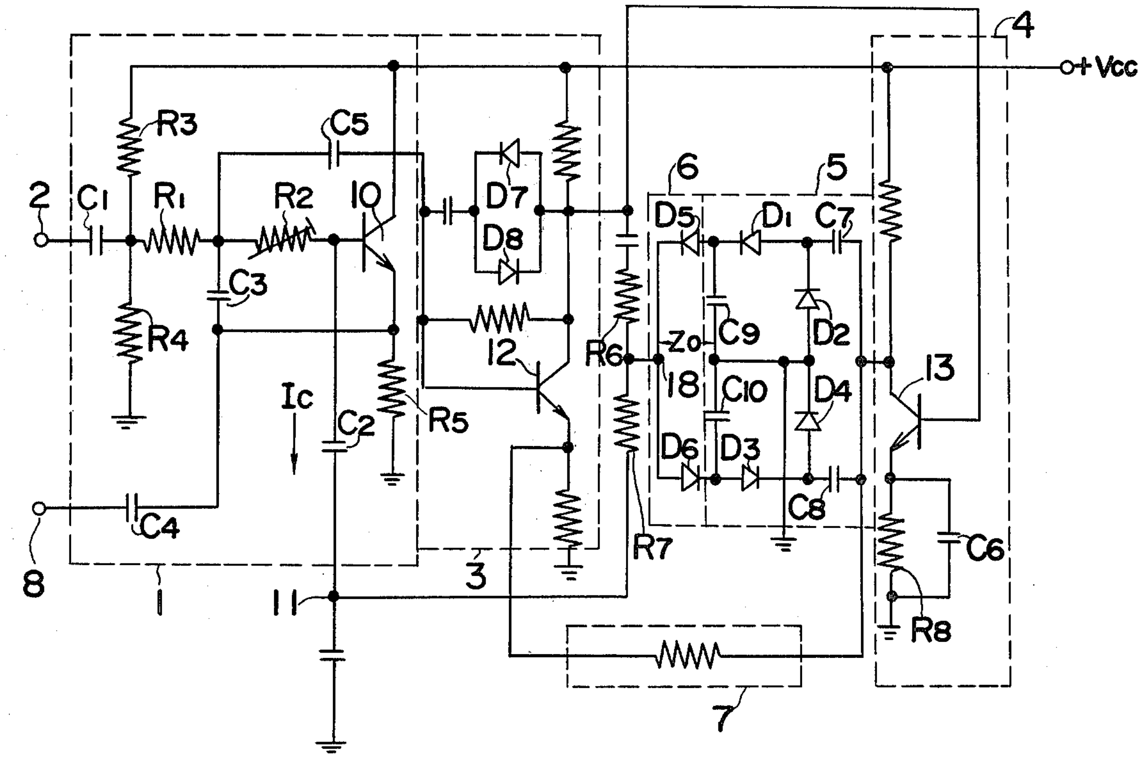
FIG. 2 shows a detailed circuit diagram of the embodiment shown in FIG. 1.

A schematic diagram of the embodiment of the present invention is shown in FIG. 2, in which like reference numerals show like portions in FIG. 1.

In FIG. 2, the original audio signal is applied to a base of a first transistor 10 which comprises the filter circuit 1 in association with resistors R1 through R5 and capacitors C1 through C5.

The base of the transistor 10 is connected to the capacitor C2 to which the compensation signal is applied.

Figure 4:
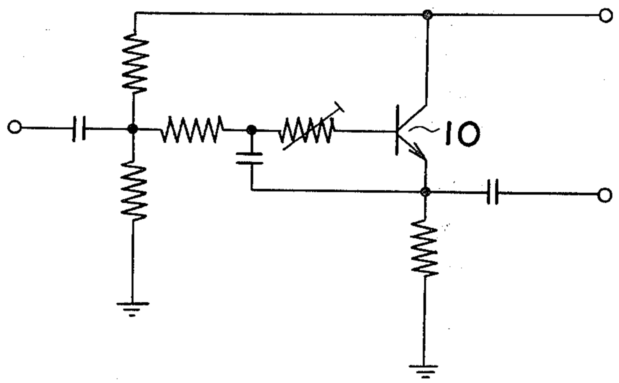
FIG. 4 is an embodiment circuit diagram of a full ban pass filter.

In the filter circuit 1 shown in FIG. 2, where no compensation signal is applied to the one terminal 11 of the capacitor C2, the circuit can be represented by an equivalent circuit of FIG. 4, which operates as a full band pass circuit.

Figure 3:
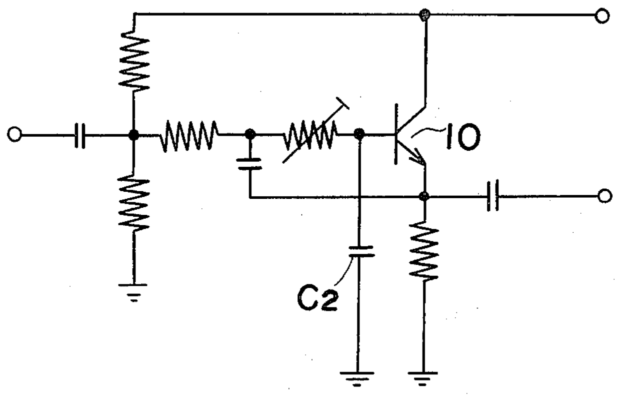
FIG. 3 is an embodiment circuit diagram of an high cut filter.

However, where a compensation signal which is similar to the current I*c* flowing in the capacitor C2 from the base of the transistor 10 to the ground is applied to the point 11, the filter circuit 1 can be represented by an equivalent circuit of FIG. 3, which operates as a high frequency filter in which capacitor C2 is inserted between the base and the ground. In order to supply a compensation signal having the same phase as the current I*c*, the original signal is derived from a junction point of a resistor R1 and a variable resistor R2. The derived signal is fed to base of a transistor 12 composing of compensation signal amplifier 3 through the capacitor C5 which is employed for representing high boost characteristics.

The collector output of the transistor 12 is fed through resistors R6 and R7 to the point 11 as the compensation signal.

On the other hand, the collector output of the transistor 12 is applied to a base of a transistor 13 comprising the control signal amplifier 4 in association with resistor R8 and capacitor C6 which is connected in the emitter circuit so that a large control signal can be obtained at the collector of the transistor 13 only when the original signal has a high frequency component or large amplitude.

The control signal is applied to rectifier circuit 5 composed of capacitors C7, C8 diodes D1 through D4 and capacitors C9, and C10 both of which determine the time constant of the circuit of the present invention. The time constant of the rectifier circuit is made small so as to change rapidly the characteristic of the filter circuit in response to the change of the input signal.

A cathode of the diode D1 is connected to an anode of a diode D5 the cathode of which is connected with an anode of a diode D6. The cathode of the diode D6 is connected to the anode of the diode D3.

The common junction point of the diodes D5 and D6 is connected to the common junction point of the resistors R6 and R7. In such construction as described above, where the diodes D5 and D6 are in a cut off condition, the impedance Z*o* between common junction point 18 and ground is maintained high so that the compensation signal can appear at the point 11, on the other hand where the diodes D5 and D6 are conducting in response to the application of a D.C. voltage fed from the rectifier circuit 5, the impedance is lowered thereby causing the compensation signal on the point 11 to disappear.

Accordingly, where the original signal includes a high frequency component, the control signal amplifier 4 produces an output, which is rectified by the rectifier 5, thereby causing the diodes D5 and D6 to conduct. Therefore, the impedance becomes low causing the compensation signal to disappear, thereby the filter circuit 1 operates as full band pass filter.

Where the original audio signal does not include high frequency component, the transistor 13 does not produce an output. Accordingly, the diodes D5, D6 do not conduct, whereby the impedance Z*o* is maintained high, so that compensation signal is applied to the capacitor C2, and thus the filter circuit 1 operates as high frequency filter. Therefore the noise component of high frequency is eliminated by the filter circuit 1.

Two diodes D7 and D8 are provided between the collectors of the transistor 12 and base thereof in the form of a negative feed back circuit for the purpose of improving distortion of the compensation signal applied to the filter circuit 1 in such a manner that said diodes D7 and D8 clip peak portions in the positive and negative phase of the input signal symmetrically when the level of the input signal exceeds predetermined value, so that the level of the compensation signal is lowered. Therefore, the collector output of the transistor 13 is symmetrical in both phases, so that the respective levels of the full wave D.C. outputs of the rectifier circuit 5 become equal. As a result, impedance of the respective diodes D5 and D6 becomes equal, therefore, both phases of the compensation signal can be by-passed symmetrically through respective diodes D5 and D6. This means that even if the level of the input signal is large, distortion of the compensation signal which is caused by an unbalance of the wave of the control signal can be reduced.

In the operation of the circuit of FIG. 2, the phase of the collector output of the third transistor 13 changes in response to the value of the capacitor C6. Therefore, the phase of the compensation signal which is applied to the base of the transistor 10 from the collector of the transistor 12 can be adjusted properly by chosing the value of the capacitor C6 and resistor 7.

On the other hand, distortion of the output of the compensation amplifier 3 is lowered by the effect of negative feed back circuit 7. As the result, the ripple component of the D.C. output supplied from the rectifier circuit 5 is reduced.

FIG. 5 shows frequency response curves of the circuit shown in FIG. 2, in which the horizontal axis represents frequency and the vertical axis represens output signal level of the filter circuit 1. Each curve is represented by taking input signal levels as parameter. These performance curves show that the attenuation ratio of the filter circuit 1 in high frequency range increases with a decrease of the input signal level applied to the filter circuit 1.

What is claimed is:

1. A high frequency noise reduction apparatus comprising:

a. a variable frequency band pass filter means having a variable frequency characteristic, for receiving a program source signal and high frequency noise and for attenuating the high frequency noise when the program source signal does not contain a high frequency component or when the amplitude of the program source signal is below a predetermined level, the frequency characteristic of said filter means varying in response to a compensation signal applied thereto;

b. compensation signal amplifier means, having its input coupled to said filter means for receiving the program source signal from said filter means and for deriving a compensation signal therefrom, the output of said compensation signal amplifier means being coupled to said filter means for applying the compensation signal thereto;

c. control signal amplifier means, having its input coupled to the output of said compensation signal amplifier means, for generating a control signal when said program source signal includes a high frequency component or has an amplitude below the predetermined level;

d. variable impedance circuit means, coupled between the output of said control signal amplifier means and the junction of the output of said compensation signal amplifier means and said filter means for controlling the compensation signal applied to said filter means in response to the control signal from said control signal amplifier such that no compensation signal is applied to said filter means when the source program signal contains high frequency components or has an amplitude above the predetermined level.

2. The high frequency noise reduction apparatus of claim 1, wherein said filter means comprises a transistor and a capacitor means coupled between the base of said transistor and ground wherein the output of said compensation signal amplifier means and said variable impedance circuit means are coupled to said capacitor means such that the application of said compensation signal to said capacitor means eliminates current flow from the base of said transistor to ground through said capacitor means.

3. The high frequency noise reduction apparatus of claim 1, further including feedback means, coupled between said control signal amplifier means and said compensation signal amplifier means, for reducing distortion in the compensation signal.

* * * * *